US011608108B2

(12) United States Patent
Maruyama et al.

(10) Patent No.: US 11,608,108 B2
(45) Date of Patent: Mar. 21, 2023

(54) AUTOMATIC STEERING SYSTEM AND AUTOMATIC STEERING METHOD

(71) Applicant: Toyota Jidosha Kabushiki Kaisha, Toyota (JP)

(72) Inventors: Shun Maruyama, Numazu (JP); Takahiro Kojo, Gotemba (JP); Yoji Kunihiro, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/345,540

(22) Filed: Jun. 11, 2021

(65) Prior Publication Data

US 2022/0017141 A1 Jan. 20, 2022

(30) Foreign Application Priority Data

Jul. 17, 2020 (JP) .............................. JP2020-122907

(51) Int. Cl.
*B62D 5/04* (2006.01)
*B62D 6/00* (2006.01)

(52) U.S. Cl.
CPC ........... *B62D 5/0484* (2013.01); *B62D 5/049* (2013.01); *B62D 6/003* (2013.01)

(58) Field of Classification Search
CPC ................................ B62D 5/049; B62D 6/003
See application file for complete search history.

(56) References Cited

U.S. PATENT DOCUMENTS

| 6,098,733 | A | * | 8/2000 | Ibaraki | ................ | B60W 50/029 |
| | | | | | | 701/55 |
| 7,692,534 | B2 | | 4/2010 | Kataoka et al. | | |

(Continued)

FOREIGN PATENT DOCUMENTS

| CN | 1439556 | A | * | 9/2003 | ............ B60T 8/1755 |
| CN | 1491170 | A | * | 4/2004 | ............... B62D 6/04 |
| CN | 1876468 | A | * | 12/2006 | ............... B62D 6/04 |
| CN | 104773173 | A | * | 7/2015 | |

(Continued)

OTHER PUBLICATIONS

"The development of vehicle stability control at Ford;" Tseng et al.; IEEE/ASME Transactions on Mechatronics (vol. 4, Issue: 3, pp. 223-234); Sep. 1, 1999. (Year: 1999).*

(Continued)

*Primary Examiner* — Khoi H Tran
*Assistant Examiner* — Jorge O Peche
(74) *Attorney, Agent, or Firm* — Dinsmore & Shohl LLP

(57) ABSTRACT

An automatic steering system comprises a controller. The controller executes target steering angle calculation processing. The controller further calculates a learning value of lateral acceleration. The learning value is calculated based on an error of a detected value of the lateral acceleration by an acceleration sensor and an estimation value of the lateral acceleration calculated using driving speed and yaw rate. In the target steering angle calculation processing, it is judged whether the acceleration sensor is normal. If it is judged that the acceleration sensor is normal, a target steering angle is calculated by using the detected value. Otherwise, the lateral acceleration used to calculate the target steering angle is switched from the detected value to a backup value of the lateral acceleration. The backup value is calculated using the estimation value and the learning value calculated before a timing at which the acceleration sensor is judged to be abnormal.

4 Claims, 10 Drawing Sheets

(56) References Cited

U.S. PATENT DOCUMENTS

| | | | |
|---|---|---|---|
| 8,155,798 B2* | 4/2012 | Seiniger | B60T 8/1706 701/1 |
| 8,352,124 B2 | 1/2013 | Taguchi | |
| 8,521,352 B1* | 8/2013 | Ferguson | G05D 1/0274 701/25 |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,714,034 B2 | 7/2017 | Otake et al. | |
| 9,868,469 B2 | 1/2018 | Sakakibara et al. | |
| 9,880,558 B2 | 1/2018 | Nakamura | |
| 9,902,399 B2 | 2/2018 | Torii et al. | |
| 9,914,492 B1 | 3/2018 | Hummelshøj | |
| 10,345,443 B2 | 7/2019 | Masui et al. | |
| 10,569,721 B2 | 2/2020 | Frederick et al. | |
| 10,579,056 B2 | 3/2020 | Matsumura | |
| 10,611,240 B2 | 4/2020 | Masui et al. | |
| 10,625,781 B2* | 4/2020 | Kataoka | B60W 30/12 |
| 10,656,651 B2* | 5/2020 | Ozawa | G05D 1/0088 |
| 10,668,940 B2 | 6/2020 | Nakade | |
| 10,710,632 B2* | 7/2020 | Sato | B62D 15/025 |
| 10,752,234 B2 | 8/2020 | Kunihiro et al. | |
| 10,754,347 B2 | 8/2020 | Kamata | |
| 10,759,419 B2 | 9/2020 | Kindo et al. | |
| 10,759,477 B2 | 9/2020 | Ide | |
| 10,845,807 B2 | 11/2020 | Mukaiyama | |
| 10,882,514 B2 | 1/2021 | Yamashita | |
| 10,889,293 B2* | 1/2021 | Viehmann | B60W 30/09 |
| 10,953,883 B2 | 3/2021 | Sakaguchi | |
| 10,960,924 B2 | 3/2021 | Rowell et al. | |
| 10,991,176 B2 | 4/2021 | Yoshizaki et al. | |
| 11,001,198 B2 | 5/2021 | Morimura et al. | |
| 11,027,778 B2 | 6/2021 | Ide et al. | |
| 11,104,381 B2 | 8/2021 | Ikeda et al. | |
| 11,150,649 B2 | 10/2021 | Sato et al. | |
| 11,175,673 B2 | 11/2021 | Eshima | |
| 11,208,099 B2 | 12/2021 | Kindo et al. | |
| 11,254,356 B2 | 2/2022 | Kato | |
| 11,267,326 B2 | 3/2022 | Nagaya et al. | |
| 11,267,452 B2 | 3/2022 | Okuda et al. | |
| 11,274,937 B2 | 3/2022 | George | |
| 11,294,388 B2 | 4/2022 | Yang et al. | |
| 11,312,410 B2 | 4/2022 | Sekiya et al. | |
| 11,338,856 B2 | 5/2022 | McGill et al. | |
| 11,352,058 B2* | 6/2022 | Hayashi | B62D 15/025 |
| 11,364,953 B2 | 6/2022 | Nemoto | |
| 11,377,145 B2 | 7/2022 | Ozawa et al. | |
| 11,377,149 B2 | 7/2022 | Sato et al. | |
| 11,383,737 B2* | 7/2022 | Sugano | G05D 1/0297 |
| 2006/0065050 A1* | 3/2006 | Saito | B60T 8/172 73/511 |
| 2007/0073494 A1* | 3/2007 | Isono | B60T 8/172 702/41 |
| 2007/0299580 A1* | 12/2007 | Lin | B60W 50/16 701/41 |
| 2008/0019567 A1* | 1/2008 | Takagi | G06V 20/58 382/103 |
| 2016/0090100 A1* | 3/2016 | Oyama | B62D 15/025 701/23 |
| 2016/0101809 A1* | 4/2016 | Hong | B62D 5/049 701/43 |
| 2017/0072996 A1* | 3/2017 | Hong | B62D 5/049 |
| 2019/0255971 A1* | 8/2019 | Sakato | B60N 2/0244 |
| 2020/0198699 A1* | 6/2020 | Lee | B62D 6/04 |
| 2021/0078581 A1* | 3/2021 | Velazquez Alcantar | B60L 3/10 |
| 2022/0017141 A1* | 1/2022 | Maruyama | B62D 15/025 |

FOREIGN PATENT DOCUMENTS

| | | | | | |
|---|---|---|---|---|---|
| CN | 110316197 | A | * | 10/2019 | B60W 40/072 |
| CN | 112907781 | A | * | 6/2021 | |
| CN | 113942570 | A | * | 1/2022 | B62D 5/0484 |
| DE | 10144880 | A1 | * | 3/2003 | B60G 17/0195 |
| DE | 102011077108 | A1 | * | 12/2012 | B60W 40/109 |
| DE | 112009000955 | B4 | * | 5/2017 | B60T 8/1755 |
| DE | 102019212933 | A1 | * | 3/2020 | B60W 10/20 |
| DE | 102020209829 | A1 | * | 3/2021 | B60W 30/18172 |
| DE | 102020100719 | A1 | * | 7/2021 | |
| EP | 1950116 | B1 | * | 2/2010 | B60T 8/1755 |
| EP | 2325069 | A1 | * | 5/2011 | B60W 30/12 |
| EP | 2905193 | A1 | * | 8/2015 | B60L 15/20 |
| JP | H10181551 | A | * | 7/1998 | |
| JP | H1123311 | A | * | 1/1999 | |
| JP | H11180328 | A | | 7/1999 | |
| JP | 2002331951 | A | * | 11/2002 | |
| JP | 2004150973 | A | * | 5/2004 | B60T 8/172 |
| JP | 2005212522 | A | * | 8/2005 | |
| JP | 2005528265 | A | * | 9/2005 | |
| JP | 2007509808 | A | * | 4/2007 | |
| JP | 4127062 | B2 | * | 7/2008 | B60T 8/172 |
| JP | 5347500 | B2 | * | 11/2013 | |
| JP | 2014098591 | A | * | 5/2014 | |
| JP | 2016-084092 | A | | 5/2016 | |
| JP | 2018203032 | A | * | 12/2018 | B60W 30/02 |
| WO | WO-9914492 | A1 | * | 3/1999 | F04B 1/148 |
| WO | WO-03008243 | A1 | * | 1/2003 | B60T 8/172 |

OTHER PUBLICATIONS

"Technical challenges in the development of vehicle stability control system;" Tseng et al., Proceedings of the 1999 IEEE International Conference on Control Applications (Cat. No. 99CH36328) (vol. 2, pp. 1660-1666 vol. 2); Jan. 1, 1999. (Year: 1999).*

"Emergency Steering Evasion Assistance Control Based on Driving Behavior Analysis;" Zhao et al.; IEEE Transactions on Intelligent Transportation Systems (vol. 20, Issue: 2, pp. 457-475); Mar. 24, 2018. (Year: 2018).*

"Autonomous Vehicle Following System In Off-road Environment;" Yang et al.; 2020 3rd International Conference on Unmanned Systems (ICUS) (pp. 1173-1179); Nov. 27, 2020. (Year: 2020).*

* cited by examiner

AUTOMATIC STEERING SYSTEM AND AUTOMATIC STEERING METHOD

CROSS-REFERENCE TO RELATED APPLICATION

The present application claims priority under 35 U.S.C. § 119 to Japanese Patent Application No. 2020-122907, filed Jul. 17, 2020, the contents of which application are incorporated herein by reference in their entirety.

TECHNICAL FIELD

The present disclosure relates to a system and a method to execute automatic steering control of a vehicle.

BACKGROUND

JP2016-084092A discloses an autonomous driving system in which fail-safe control is executed during the execution of steering assist control. The steering assist control is a control that assists a steering of a driver the vehicle such that the vehicle runs along a target pass line. In this conventional system, the fail-safe control is executed when an anomaly in a yaw motion control system is predicted. In the fail-safe control, the target pass line is corrected considering a delay in a response of the driver. In the fail-safe control, also, a target steering angle is calculated such that the vehicle runs along the corrected target pass line.

SUMMARY

Consider a case where automatic steering control is executed. In the automatic steering control, a steering angle is controlled such that the vehicle runs along the target pass line. The automatic steering control can also be implemented in the conventional system mentioned above. However, in the fail-safe control of conventional systems, it is not assumed that an abnormality occurs in a sensor and an abnormal value is outputted. Therefore, if the abnormal value is outputted during the execution of the automatic steering control, the target steering angle is not correctly calculated, and the vehicle may deviate from the target pass line.

In particular, when if the abnormal value is outputted from an acceleration sensor that detects a "lateral acceleration" which is an acceleration in a transverse direction (i.e., vehicle's width direction), there is a possibility that the deviation problem becomes conspicuous. Therefore, it is required to develop a method for ensuring a tracking performance to the target pass line when an anomaly occurs in the acceleration sensor.

One object of the present disclosure is to provide a technique capable of ensuring the tracking performance to the target pass line even when an anomaly occurs in the acceleration sensor during the execution of the automatic steering control.

A first aspect is an automatic steering system in which automatic steering control of a vehicle is executed.

The automatic steering system comprises a detection device and a controller.

The detection device is configured to detect driving environment information of the vehicle.

The controller is configured to execute target steering angle calculation processing to calculate a target steering angle in the automatic steering control based on the driving environment information.

The detection device includes an acceleration sensor, a vehicle speed sensor and a yaw rate sensor.

The acceleration sensor is configured to detect lateral acceleration of the vehicle.

The vehicle speed sensor is configured to detect driving speed of the vehicle.

The yaw rate sensor is configured to detect yaw rate of the vehicle.

The controller is further configured to calculate a learning value of the lateral acceleration. The learning value is calculated based on an error of a detected value of the lateral acceleration and an estimation value of the lateral acceleration calculated by using the driving speed and the yaw rate.

In the target steering angle calculation processing, the controller judges whether or not the acceleration sensor is normal.

If it is judged that the acceleration sensor is normal, the controller calculates the target steering angle by using the detected value.

If it is judged that the acceleration sensor is abnormal, the controller switches the lateral acceleration used to calculate the target steering angle from the detected value to a backup value of the lateral acceleration. The backup value is calculated by using the estimation value and the learning value that is calculated before a timing at which the acceleration sensor is judged to abnormal.

A second aspect further has the following features in the first aspect.

In the target steering angle calculation processing, the controller is configured to calculate the target steering angle by using a slant angle feedforward control term that is set in accordance with a slant angle of a road.

If it is judged that the acceleration sensor is normal, the slant angle feedforward control term is calculated by using the detected value.

If it is judged that the acceleration sensor is abnormal, the slant angle feedforward control term is calculated by using the backup value after a predetermined transition period that is reckoning from the timing.

During the transition period, the slant angle feedforward control term is calculated by using an intermediate value that gradually approaches the backup value from the detected value. The transition period is set to a longer period as an absolute value of the slant angle feedforward control term calculated by using the detected value immediately before the timing decreases.

A third aspect further has the following features in the first aspect.

In the target steering angle calculation processing, the controller is configured to:

calculate a slant angle feedforward control term that is set in accordance with a slant angle of a road; and calculate, based on the driving environment information, a line following control term indicating a control term for reducing deviation amount of the vehicle to target pass line. The line following control term includes a time-integrated integral control term obtained by integrating the deviation amount over time.

In the target steering angle calculation processing, the controller is further configured to:

if it is judged that the acceleration sensor is abnormal, judge whether or not the vehicle speed sensor and the yaw rate sensor are normal;

if it is judged that the vehicle speed sensor and the yaw rate sensor are normal, calculate the target steering angle by using the line following control term and the slant angle feedforward control term; and if it is judged that the vehicle speed sensor or the yaw rate sensor is abnormal, calculate the target steering angle by using the time-integrated integral control term instead of the slant angle feedforward control term.

When the slant angle feedforward control term is not used, a control gain of the time-integrated integral control term is increased as compared with a case where the slant angle feedforward control term is used.

A fourth aspect is an automatic steering method in which automatic steering control of a vehicle is executed by a controller.

The vehicle comprises a detection device which is configured to detect driving environment information of the vehicle.

The detection device includes an acceleration sensor, a vehicle speed sensor and a yaw rate sensor.

The acceleration sensor is configured to detect lateral acceleration of the vehicle.

The vehicle speed sensor is configured to detect driving speed of the vehicle.

The yaw rate sensor is configured to detect yaw rate of the vehicle.

The method comprising the steps of:
executing target steering angle calculation processing to calculate a target steering angle in the automatic steering control based on the driving environment information; and
calculating a learning value of the lateral acceleration, the learning value is calculated based on an error of a detected value of the lateral acceleration and an estimation value of the lateral acceleration calculated by using the driving speed and the yaw rate.

The step of executing the target steering angle calculation processing includes the steps of:
judging whether or not the acceleration sensor is normal;
if it is judged that the acceleration sensor is normal, calculating the target steering angle by using the detected value; and
if it is judged that the acceleration sensor is abnormal, switching the lateral acceleration used to calculate the target steering angle from the detected value to a backup value of the lateral acceleration.

The backup value is calculated by using the estimation value and the learning value that is calculated before a timing at which the acceleration sensor is judged to abnormal.

A fifth aspect further has the following features in the fourth aspect.

The step of executing the target steering angle calculation processing further includes the step of calculating the target steering angle by using a slant angle feedforward control term that is set in accordance with a slant angle of a road.

If it is judged that the acceleration sensor is normal, the slant angle feedforward control term is calculated by using the detected value.

If it is judged that the acceleration sensor is abnormal, the slant angle feedforward control term is calculated by using the backup value after a predetermined transition period that is reckoning from the timing.

During the transition period, the slant angle feedforward control term is calculated by using an intermediate value that gradually approaches the backup value from the detected value. The transition period is set to a longer period as an absolute value of the slant angle feedforward control term calculated by using the detected value immediately before the timing decreases.

A sixth aspect has the following features in the fourth aspect.

The step of executing the target steering angle calculation processing includes the steps of:
calculating a slant angle feedforward control term that is set in accordance with a slant angle of a road;
calculating, based on the driving environment information, a line following control term indicating a control term for reducing deviation amount of the vehicle to target pass line is calculated, the line following control term includes a time-integrated integral control term obtained by integrating the deviation amount over time;
if it is judged that the acceleration sensor is abnormal, judging whether or not the vehicle speed sensor and the yaw rate sensor are normal;
if it is judged that the vehicle speed sensor and the yaw rate sensor are normal, calculating the target steering angle by using the line following control term and the slant angle feedforward control term; and
if it is judged that the vehicle speed sensor or the yaw rate sensor is abnormal, calculating the target steering angle by using the time-integrated integral control term instead of the slant angle feedforward control term, When the slant angle feedforward control term is not used, a control gain of the time-integrated integral control term is increased as compared with a case where the slant angle feedforward control term is used.

According to the first or fourth aspect, if it is judged that the acceleration sensor is normal, the target steering angle is calculated by using the detected value of the lateral acceleration by the horizontal acceleration sensor. If it is judged that the acceleration sensor is abnormal, the target steering angle is calculated by using the backup value of the lateral acceleration. This backup value is calculated based on the estimation value of the lateral acceleration and the learning value, and this learning value is calculated based on the detected value and the error of the estimation value. Therefore, it is expected that the target steering angle calculated by using the backup value is approximately close to the target steering angle calculated by using the detected value.

Therefore, according to the first of fourth aspect, even if it is judged that the acceleration sensor is abnormal, it is possible to continuously execute the automatic steering control with substantially the same accuracy as the automatic steering control that was executed before the judgement. Therefore, according to the first or fourth aspect, even when an anomaly occurs in the acceleration sensor during the execution of the automatic steering control, it is possible to ensure the tracking performance to the target pass line.

According to the second or fifth aspect, if it is judged that the acceleration sensor is abnormal, the predetermined transition period that is reckoning from the timing of the judgement is set. Further, in this transition period, the target steering angle is calculated by using the intermediate value gradually approaching backup the value from the detected value. This transition period is set to a longer period as the absolute value of the slant angle feedforward control term that is calculated by using the detected value immediately before the timing decreases.

Here, since the slant angle feedforward control term is set in accordance with the slant angle of the road, a smaller absolute value means that a road surface is relatively flat and a position of the vehicle is hardly shifted in an inclination direction. Therefore, when the absolute value is small, it is expected that the tracking performance to the target pass line is ensured even if the transition period is set for a relatively long period. Therefore, according to the second or fifth aspect in which the target steering angle is calculated by using the intermediate value in a relatively long transition period, it is possible to reduce a rate of change in the target steering angle accompanying a switching from the detected value to the backup value. Therefore, it is possible to suppress the occupant of the vehicle from feeling of a strangeness due to the change in the target steering angle.

According to the third or sixth aspect, if it is judged that the vehicle speed sensor or the yaw rate sensor is abnormal in addition to the acceleration sensor, the target steering angle is calculated by using the time-integrated integral control term instead of the slant angle feedforward control term. In this case, the control gain of the time-integrated integral control term is increased as compared with the case where the slant angle feedforward control term is used.

Here, the time-integrated integral control term is a control term that integrates the deviation amount for the target pass line of the vehicle over time. Therefore, if the control gain of the time-integrated integral control term is increased, speed at which the deviation amount is accumulated increases. Then, when the deviation amount increases, an effect of the time-integrated integral control term increases. Therefore, according to the third of sixth aspect, it is possible to compensate for a decrease in the tracking performance to the target pass line due to the disuse of the slant angle feedforward control term.

DESCRIPTION OF EMBODIMENT

Figure 1:
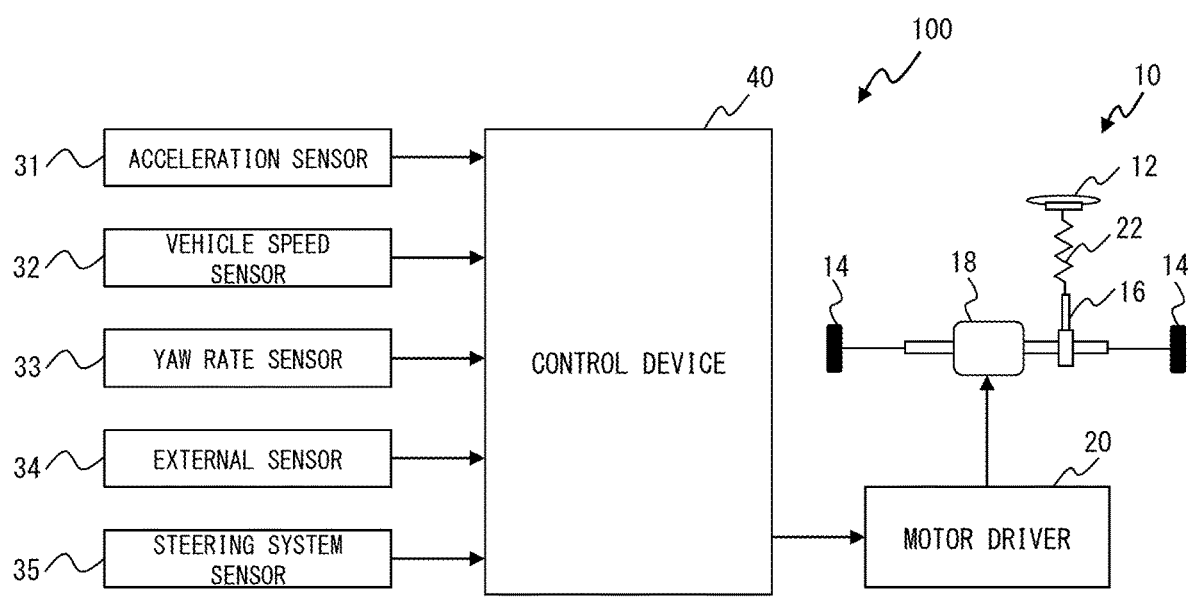
FIG. 1 is a diagram showing a configuration example of an automatic steering system according to a first embodiment.

Hereinafter, embodiments of present disclosure will be described referring to the drawings. It should be noted that the same signs are attached to the same elements in the respective drawings, and duplicate descriptions are omitted. In addition, the present disclosure is not limited to the embodiments described below, and may be implemented in various aspects.

1. First Embodiment

An automatic steering system of a first embodiment of the present disclosure will be explained by referring to FIGS. 1 to 7.

1-1. Configuration Example of System

FIG. 1 is a diagram showing a configuration example of the automatic steering system according to the first embodiment. An automatic steering system 100 shown in FIG. 1 is mounted on a vehicle VH. The vehicle VH is, for example, a vehicle in which an internal combustion engine such as a diesel engine or a gasoline engine is used as a power source, an electronic vehicle in which an electric motor is used as the power source, or a hybrid vehicle including the internal combustion engine and the electric motor. The electric motor is driven by a battery such as a secondary cell, a hydrogen cell, a metallic fuel cell, and an alcohol fuel cell.

As shown in FIG. 1, the system 100 includes an EPS (Electronic Power Steering) device 10. In the example shown in FIG. 1, the EPS device 10 includes a steering wheel 12, left and right tires 14, 14, a steering mechanism 16, an electric motor 18, and a motor driver 20.

The steering mechanism 16 includes, for example, a steering column shaft, a gear mechanism, and a linkage. The steering column shaft receives a rotational manipulation of the steering wheel 12. The gear mechanism increases a steering force generated by the rotational manipulation inputted to a steering shaft. The linkage transmits the steering force transmitted from the gear mechanism to the left and right tires 14 and 14.

The electric motor 18 generates a torque by receiving a command current from the motor driver 20, and applies it to the steering mechanism 16. In FIG. 1, the electric motor 18 transmits the generated torque to a rack shaft of the gear mechanism. That is, the EPS device 10 is configured as a rack-assisted EPS device. However, the EPS device 10 may be configured as a column-assisted EPS device for transmitting the generated torques to the steering column shaft. The EPS device 10 may be configured as a pinion assisted EPS device for transmitting the generated torques to a pinion shaft of the gear mechanism.

The system 100 also includes various sensors. Examples of the various sensors include an internal sensor for acquiring information on a driving condition of the vehicle VH. Examples of the internal sensor include an acceleration sensor 31, a vehicle speed sensor 32 and a yaw rate sensor 33. The acceleration sensor 31 detects lateral acceleration Gy of the vehicle VH. For convenience of explanation, a detected value of the lateral acceleration Gy is also referred to as a "detected value Gy_sen." The vehicle speed sensor (or a wheel speed sensor) 32 detects driving speed V of the vehicle VH. The driving speed V is decomposed into a travel direction component Vx and a transverse direction component Vy of the vehicle VH. The yaw rate sensor 33 detects yaw rate γ around a center of gravity axis generated when the vehicle VH is turned.

Examples of the various sensors also include an external sensor 34. The external sensor 34 acquires information on surroundings of the vehicle VH. Examples of the external sensor 34 include a camera and a radar. The camera captures a landscape in front of the vehicle VH. A radar illuminates an electromagnetic wave around the vehicle VH to detect a reflective wave. Examples of the radar include a millimeter wave radar, a microphone wave radar, and a laser radar.

Examples of the various sensors also include a steering system sensor 35. The steering system sensor 35 acquires information on an operating status of the steering wheel 12. Examples of the steering system sensor 35 include a torque sensor. The torque sensor measures, for example, a torsion of a torsion bar in the steering column shaft and converts it into a torque. Horizontal direction of the torque is specified by a positive or a negative sign of the torque. The torque sensor measures a steering angle θ in addition to the torque.

The information obtained by the various sensors (i.e., information on the driving situation, the information on the surrounding environment and the information on the steering status) is collectively referred to as "driving environment information" of the vehicle VH. A sensor for detecting such the driving environment information corresponds to a "detection device" in the present application.

The system 100 also includes a controller 40. The controller 40 acquires the driving environment information and executes automatic steering control via a communication network built inside the vehicle VH. The controller 40 is typically a microcomputer having at least one memory and at least one processor. The memory stores various programs and maps used for the steering control. The processor reads and executes the programs from the memory to realize various functions related to the automatic steering control. The controller 40 may be composed of a plurality of microcomputers.

In the automatic steering control, the controller 40 provides a control amount to the motor driver 20. This control amount is an amount to control the EPS device 10 (hereinafter also referred to as an "EPS control amount"). The EPS control amount is specified by a target steering angle θ*, which will be described in detail later. The EPS control amount is expressed by current or torque. The controller 30 controls the torque applied from the electric motor 18 to steering mechanism 16 by adjusting the EPS control amount applied to the motor driver 20. The following describes a configuration example of the controller 40.

1-2. Function Configuration Example of the Controller

Figure 2:
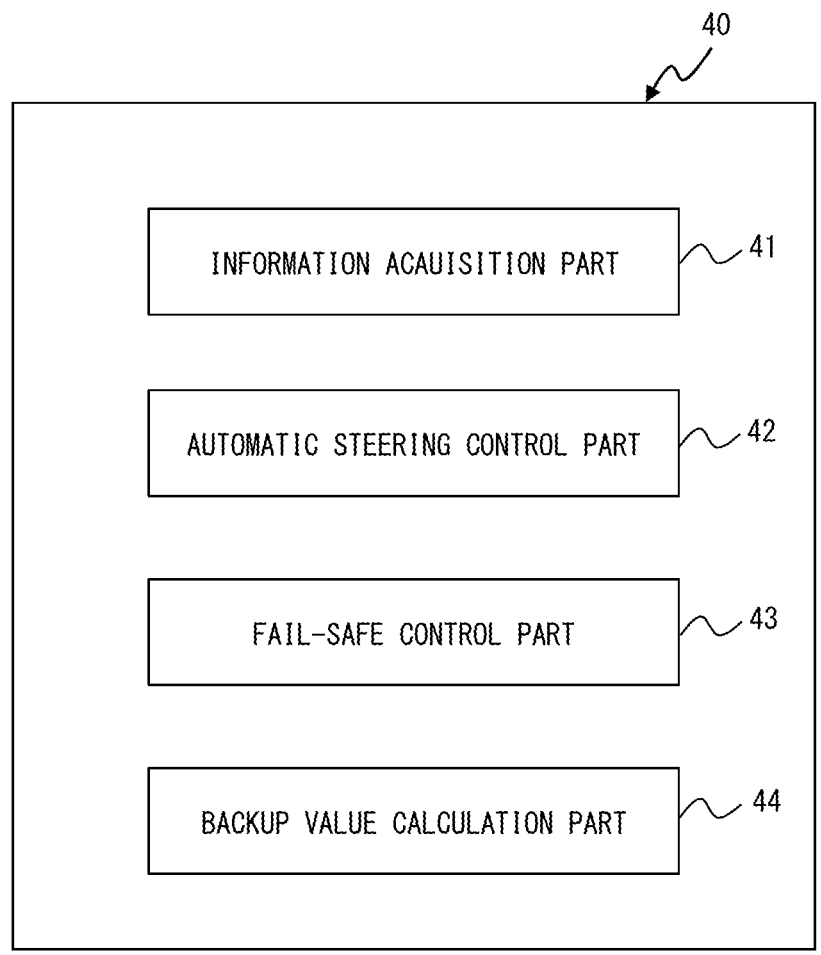
FIG. 2 is a block diagram showing a function configuration example of a controller shown in FIG. 1.

FIG. 2 is a block diagram showing a function configuration example of the controller 40. As shown in FIG. 2, the controller 40 includes an information acquisition part 41, an automatic steering control part 42, a fail-safe control part 43, and a backup value calculation part 44. These functions are realized when the processor of the controller 40 executes various control programs stored in the memory.

1-2-1. Information Acquisition Part

The information acquisition part 41 captures signals related to the driving environment information from the various sensors. The information acquisition part 41 further processes the captured signals. The processing of the signals by the information acquisition part 41 includes processing to analyze image data from the external sensor 34 (especially, from the camera). In this analysis processing, a white lane formed on roads in front of the vehicle VH is recognized. In this analysis processing, lane information required to execute the automatic steering control is generated based on the recognized white lane.

Figure 3:
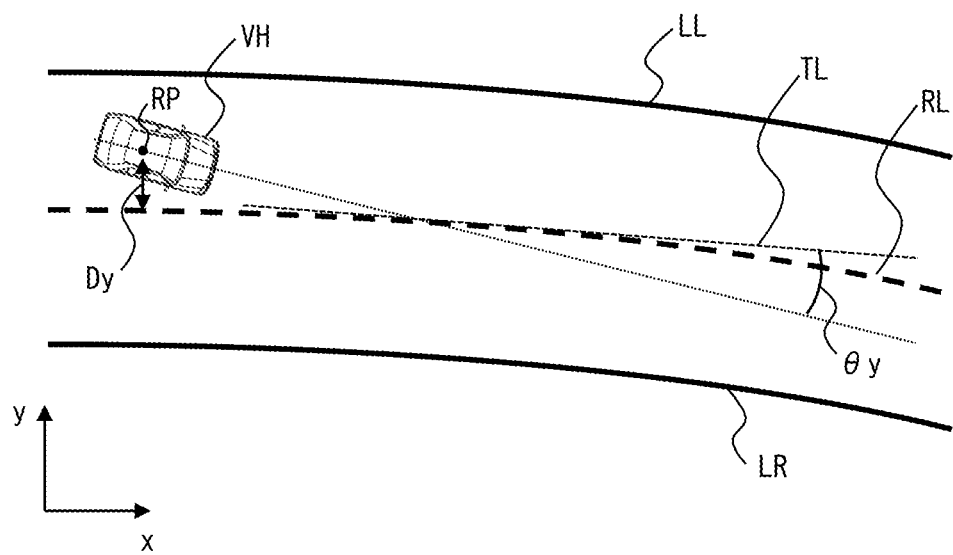
FIG. 3 is a diagram illustrating an example of lane information.

FIG. 3 is a diagram illustrating an example of the lane information. The lane information includes information on a left white lane LL and a right white lane LR shown in FIG. 3. The Left white lane LL and the right white lane LR are lane division lines recognized by the analysis processing of the image data. The lane information also includes information on a reference line RL. The reference line RL is set, for example, at a position in a central of the left white lane LL and the right white lane LR. In another example, the reference line RL is set to a position close to the right white lane LR by a predetermined distance from the left white lane LL. When the automatic steering control is executed to keep a lane along which the vehicle VH runs in a single lane, the reference line RL is set to a target pass line of the vehicle VH.

The lane information also includes information on a curvature CL of the target pass line. The curvature CL is an inverse of a curvature radius R of the target pass line (i.e., CL=1/R). When the automatic steering control is executed to keep a lane along which the vehicle VH runs in a single lane, the curvature CL is equal to the inverse of the curvature radius R of the reference line RL.

The lane information also includes information on a lateral deviation Dy and a yaw angle θy. The lateral deviation Dy is a distance in a lane width direction from a reference position RP of the vehicle VH to the reference line RL as the target pass line. That is, the lateral deviation Dy is a deviation amount of the vehicle VH to the target pass line. Note that the reference position RP is set at any position of the vehicle VH. The yaw angle θy is a slip angle of a direction of the vehicle VH relative to the target pass line. The yaw angle θy is calculated as follows, for example. First, a virtual line VL extending in a longitudinal direction of the vehicle VH is set. Subsequently, a tangent line TL of the target pass line passing through an intersection point between the virtual line VL and the target pass line is set. An angle formed between the virtual line VL and the tangent line TL is the yaw angle θy.

Return to FIG. 2 and continue to explain the function configuration example of the controller 40. The information acquisition part 41 transmits the driving environment information and the lane information to the automatic steering control part 42.

1-2-2. Automatic Steering Control Part

Figure 4:
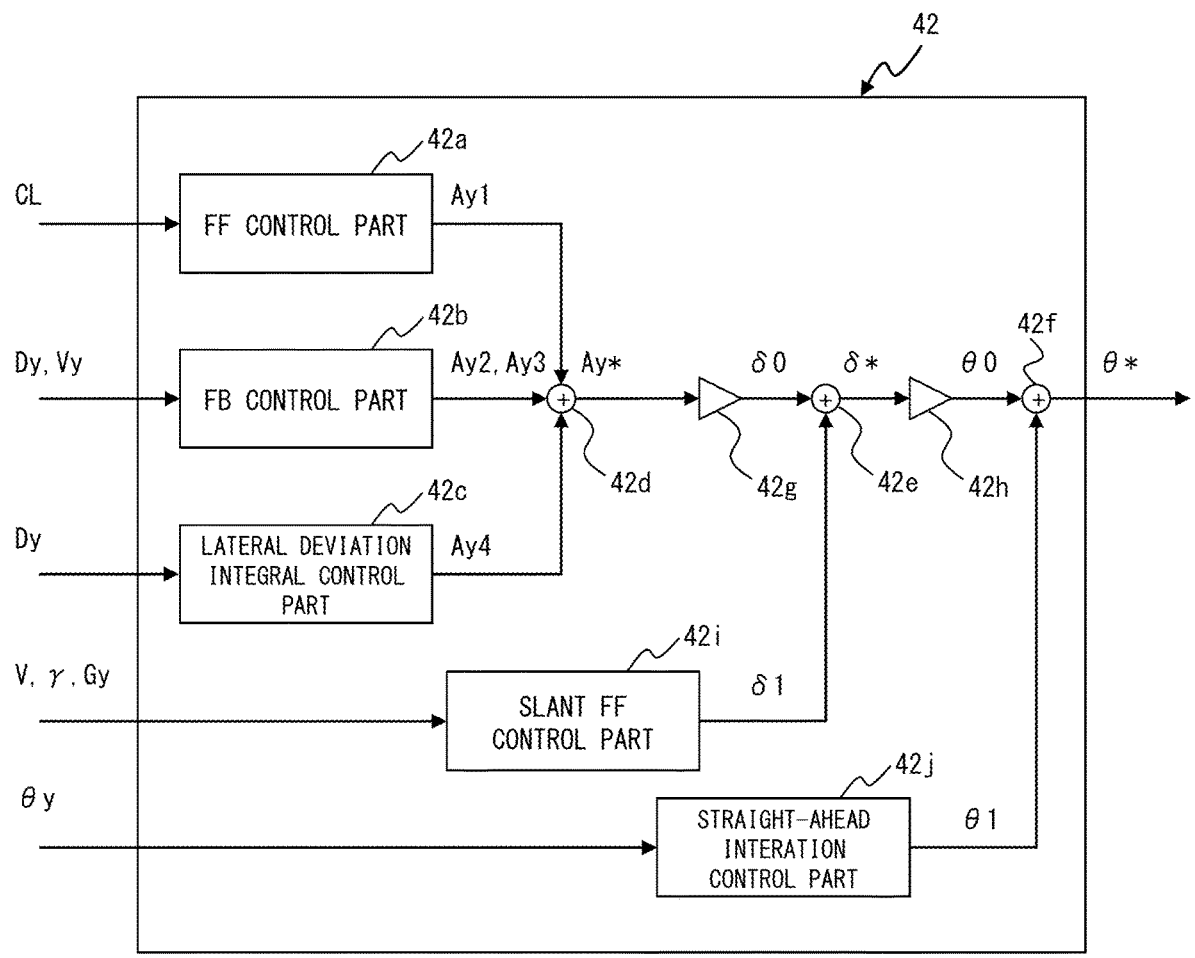
FIG. 4 is a diagram showing a control configuration example of an automatic steering control part shown in FIG. 2.

The automatic steering control part 42 executes the automatic steering control based on the driving environment information and the lane information. FIG. 4 is a diagram showing a control configuration example of the automatic steering control part 42. As shown in FIG. 4, the automatic steering control part 42 includes a FF (Feed-Forward) control portion 42a, a FB (Feed-Back) control portion 42b, a lateral deviation integral control part 42c, an adder part 42d to 42f, a gain multiplier part 42g and 42h, a slant FF control part 42i, and a straight-ahead integration control portion 42j.

The FF control part 42a calculates a FF control term Ay1 of a target lateral acceleration Ay* that is set based on the curvature CL by using the following equation (1).

$$Ay1 = CL \times V^2 \times K1 \tag{1}$$

In the equation (1), V is the driving speed and K1 is a FF control gain.

The FB control part 42b calculates a FB control term Ay2 of the target lateral acceleration Ay* that is set based on a lateral deviation Dy by using the following equation (2). The FB control part 42b also calculates a FB control term Ay3 of the target lateral acceleration Ay* that is set based on a component Vy in a transverse direction of the driving speed V by using the following equation (3).

$$Ay2 = Dy \times K2 \tag{2}$$

$$Ay3 = Vy \times K3 \tag{3}$$

In the equation (2), K2 is a lateral deviation FB control gain. In the equation (3), K3 is a lateral speed FB control gain.

The lateral deviation integral control part 42c calculates an integral control term Ay4 of the target lateral acceleration Ay* that is obtained by integrating the lateral deviation Dy with time by using the following equation (4).

$$Ay4 = Ay4(n-1) + Dy \times t \times K4 \tag{4}$$

In the equation (4), Ay4(n−1) represents an integral control term calculated in a calculation period immediately before the calculation of the Ay4, t represents the calculation period, and K4 represents a lateral deviation integral control gain. The lateral deviation integral control gain K4 functions as a constant for setting a degree to which the integral control term Ay4 can be changed per unit time (i.e., per one calculation period). The integral control term Ay4 is an integral value of the lateral deviation Dy in proportion to the lateral deviation integral control gain K4. Therefore, the greater the lateral deviation integral control gain K4, the higher the speed at which the lateral deviation Dy is accumulated.

The adder part 42d calculates a target lateral acceleration Ay* by using the following equation (5).

$$Ay^* = Ay1 + Ay2 + Ay3 + Ay4 \tag{5}$$

That is, the target lateral acceleration Ay* is calculated by a sum of the FF control term Ay1, the FB control terms Ay2 to Ay3 and the integral control term Ay4.

Here, the FF control term Ay1, the FB control terms Ay2 to Ay3 and the integral control term Ay4 are control terms for reducing an deviation amount of the vehicle VH on the target pass line, each of which corresponds to a "line following control term" in the present application.

The gain multiplier part 42g calculates a basic target tire turning angle δ0 by using the following equation (6).

$$\delta 0 = Ay^* \times K5 \tag{6}$$

In the equation (6), K5 is a gain for converting the target lateral acceleration Ay* into the basic target tire turning angle δ0.

The slant FF control part 42i calculates a slant FF control term δ1 that is set based on a slant angle θs of a road and driving speed V at which vehicle VH travels, using the following equation (7).

$$\delta 1 = -\theta s \times Kh \times K6 \times L \times g \tag{7}$$

In the equation (7), Kh is a stability factor, K6 is a gain that is set in accordance with the driving speed V, L is a wheelbase, and g is a gravitational acceleration.

Here, the slant angle θs is calculated by substituting the lateral acceleration Gy and the yaw rate γ included in the driving environment information into the following equation (8).

$$\theta s = (\gamma V - Gy)/g \tag{8}$$

The adder part 42e calculates a target tire turning angle δ* using the following equation (9).

$$\delta^* = \delta 0 + \delta 1 \tag{9}$$

That is, the target tire turning angle δ* is calculated by a sum of the basic target tire turning angle δ0 and the slant FF control term δ1.

The gain multiplier part 42h calculates a basic target steering angle θ0 by using the following equation (10).

$$\theta 0 = \delta y^* \times K7 \tag{10}$$

In the equation (10), K7 is a gain for converting the target tire turning angle δ* into the basic target steering angle θ0.

The straight-ahead integration control portion 42j calculates a straight-ahead integral control term θ1 of the target steering angle θ* obtained by integrating the yaw angle θy with time by using the following equation (11).

$$\theta 1 = \theta 1(n-1) + \theta y \times t \times K8 \tag{11}$$

In the equation (11), θ1 (n−1) is a straight-ahead integral control term that was calculated in a calculation period immediately before the calculation of θ1, t is the calculation period, and K8 represents a straight-ahead integral control gain. The straight-ahead integral control gain K8 functions as a constant for setting a degree to which the straight-ahead integral control term θ1 can be changed per unit time (i.e., per one calculation period). The straight-ahead integral control term θ1 is obtained by integrating the yaw angle θy in proportion to the straight-ahead integral control gain K8. Therefore, the greater the straight-ahead integral control gain K8, the higher the speed at which the yaw angle θy is accumulated.

The adder part 42f calculates the target steering angle θ* by using the following equation (12).

$$\theta^* = \theta 0 + \theta 1 \tag{12}$$

That is, the target steering angle θ* is calculated by a sum of the basic target steering angle θ0 and the straight-ahead integral control term θ1.

1-2-3. Fail-Safe Control Part

Return to FIG. 2 and continue to explain the function configuration example of the controller 40. The fail-safe control part 43 executes fail-safe control of the automatic steering control when an anomaly occurs in the acceleration sensor 31. Whether or not the anomaly has occurred in the acceleration sensor 31 is judged on the basis of an input of an error signal from the acceleration sensor 31. When only one acceleration sensor 31 is mounted, this judgement method is valid.

When two or more acceleration sensors 31 are mounted, the occurrence of the anomaly can be judged by comparing respective signals of the acceleration sensors 31. Here, it is assumed that acceleration sensors 31A and 31B are mounted. If a difference between the detected values Gy_sen of the acceleration sensor 31A and that of the acceleration sensor 31B is greater than or equal to a threshold, it is judged that the anomaly has occurred in one of these sensors.

When the difference between the detected values Gy_sen is equal to or larger than the threshold value and when no error signal is inputted, it is difficult to specify whether the anomaly has occurred in the acceleration sensors 31A or 31B. Therefore, in this case, it may be effective to judge that the anomaly has occurred in the acceleration sensor 31 from a viewpoint of securing a driving safety by the executing of the automatic steering control.

If it is judged that the anomaly has occurred in the acceleration sensor 31, the controller 40 stops using the detected value Gy_sen. If more than one acceleration sensor 31 is mounted, use of all detected values Gy_sen is stopped. Then, the executions of various operations in which the detected values Gy_sen are also stopped. Specifically, the calculation processing of the target steering angle θ* that is executed by the automatic steering control part 42 is stopped.

However, the execution of the calculation processing of the target steering angle θ* is continued when the execution of the fail-safe control is started. When the execution of the fail-safe control is started, the same processing as the calculation processing of the target steering angle θ* that was executed by the automatic steering control part 42 is executed by the fail-safe control part 43. A control configuration example for executing the fail-safe control is essentially the same as the one shown in FIG. 3. However, the when fail-safe control is executed, a backup value Gy_bac of the lateral acceleration Gy is used in the calculation processing of the target steering angle θ*. More specifically, the calculation of the slant FF control term δ1 is executed by using the backup value Gy_bac instead of the detected value Gy_sen. This backup value Gy_bac is calculated by the backup value calculation part 44.

1-2-4. Backup Value Calculation Part

Figure 5:
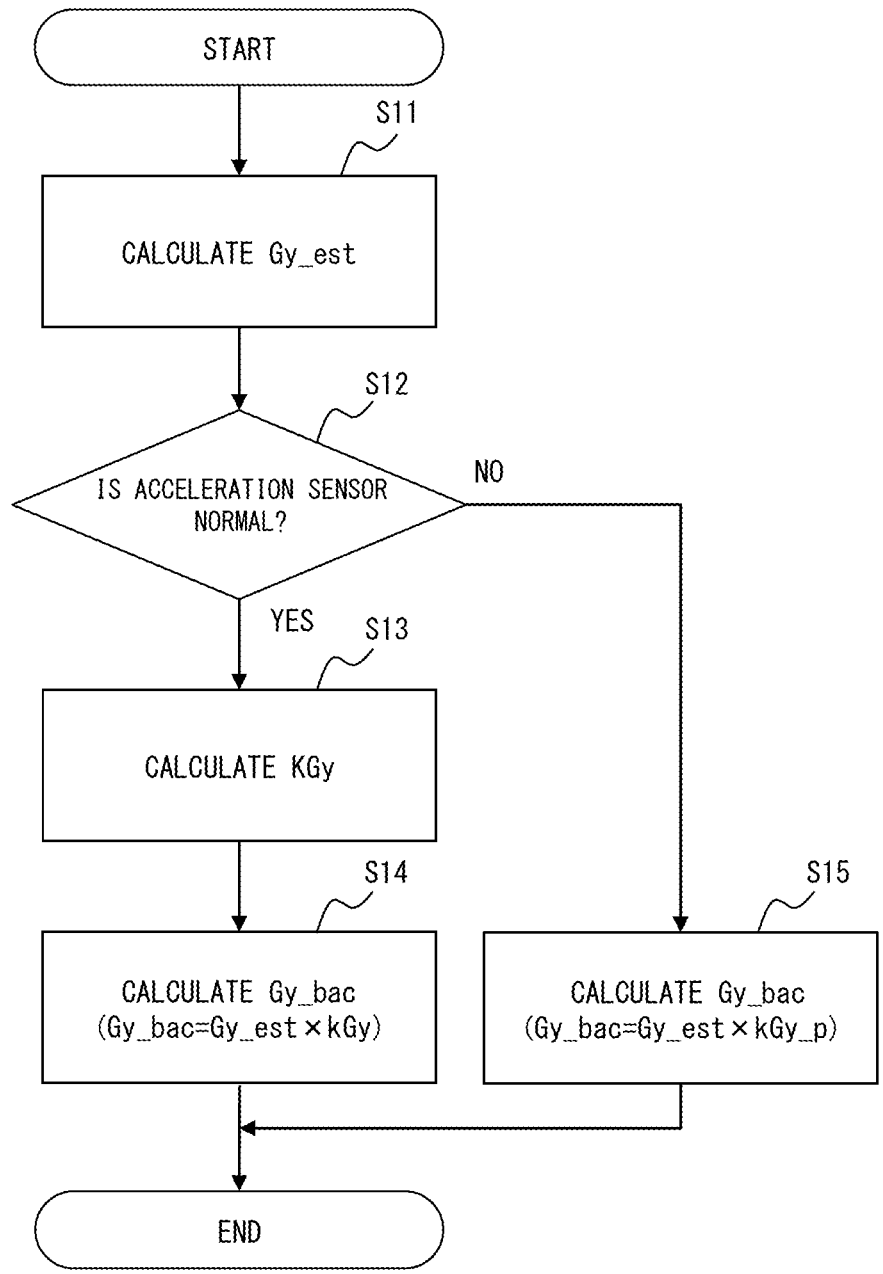
FIG. 5 is a flow chart showing a flow of calculation processing executed by a backup value calculation part shown in FIG. 2.
Figure 6:
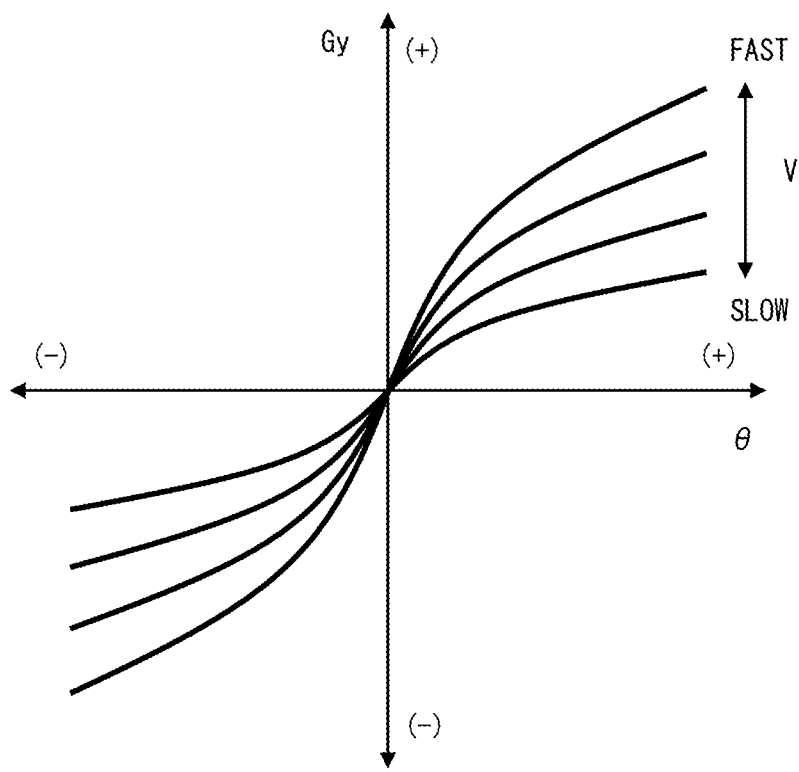
FIG. 6 is a diagram illustrating an example of a relationship between lateral acceleration, steering angle, and driving speed.

The backup value calculation part 44 calculates the backup value Gy_bac by using an estimation value Gy_est of the lateral acceleration Gy and a learning value KGy. FIG. 5 is a flowchart illustrating a flow of calculation processing executed by the backup value calculation part 44 (the processor of the controller 40). The processing routine shown in FIG. 5 is repeatedly executed every predetermined control cycle.

In the routine shown in FIG. 5, first, the estimation value Gy_est is calculated (step S11). The estimation value Gy_est is calculated, for example, based on a control map corresponding to a property indicated in FIG. 6. In the example shown in FIG. 6, a relationship between the lateral acceleration Gy, the steering angle θ, and the driving speed V is shown. The estimation value Gy_est is calculated by referring to the control map based on the steering angle θ and the driving speed V.

Subsequent to the step S11, it is judged whether or not the acceleration sensor 31 is normal (step S12). Examples of this judgement method include those described in the explanation of the fail-safe control part 43.

If the judgement result of the step S12 is positive, the learning value KGy is calculated (step S13). The learning value KGy is calculated based on an error ERR between the detected value Gy_sen and the estimation value Gy_est calculated in the step S11. The learning value KGy is set to reduce the error ERR. The learning value KGy may be an average of a reciprocal of the errors ERR within a predetermined period from the present. When the learning value KGy is calculated, a weighting may be performed according to timing at which the error ERR is obtained. For example, if the most recent data is emphasized on the calculation of the learning value KGy, data close to the present is multiplied by a large weight coefficient. If an aging of the acceleration sensor 31 is to be considered, historical data is multiplied by a large weight coefficient.

Subsequent to the step S13, the backup value Gy_bac is calculated (step S14). The backup value Gy_bac is calculated by using the estimation value Gy_est calculated in the step S11 and the learning value KGy calculated in the step S13 (Gy_bac=Gy_est*KGy).

Similar to the step S14, even if the judgement result of the step S12 is negative, the backup value Gy_bac is calculated (step S15). However, unlike the case where the processing of the step S14 is executed, the acceleration sensor 31 is not normal when the processing of the step S15 is executed. Therefore, a reliability of the detected value Gy_sen is low, and thus it is expected that the reliability of the learning value KGy is low. Therefore, in the calculating the backup value Gy_bac of the step S15, the learning value KGy_p that was calculated before the execution of the processing of the step S12 is used. Examples of the learning value KGy_p include the learning value KGy that was calculated immediately before the processing of the step S12.

1-3. Target Steering Angle Calculation Processing

Figure 7:
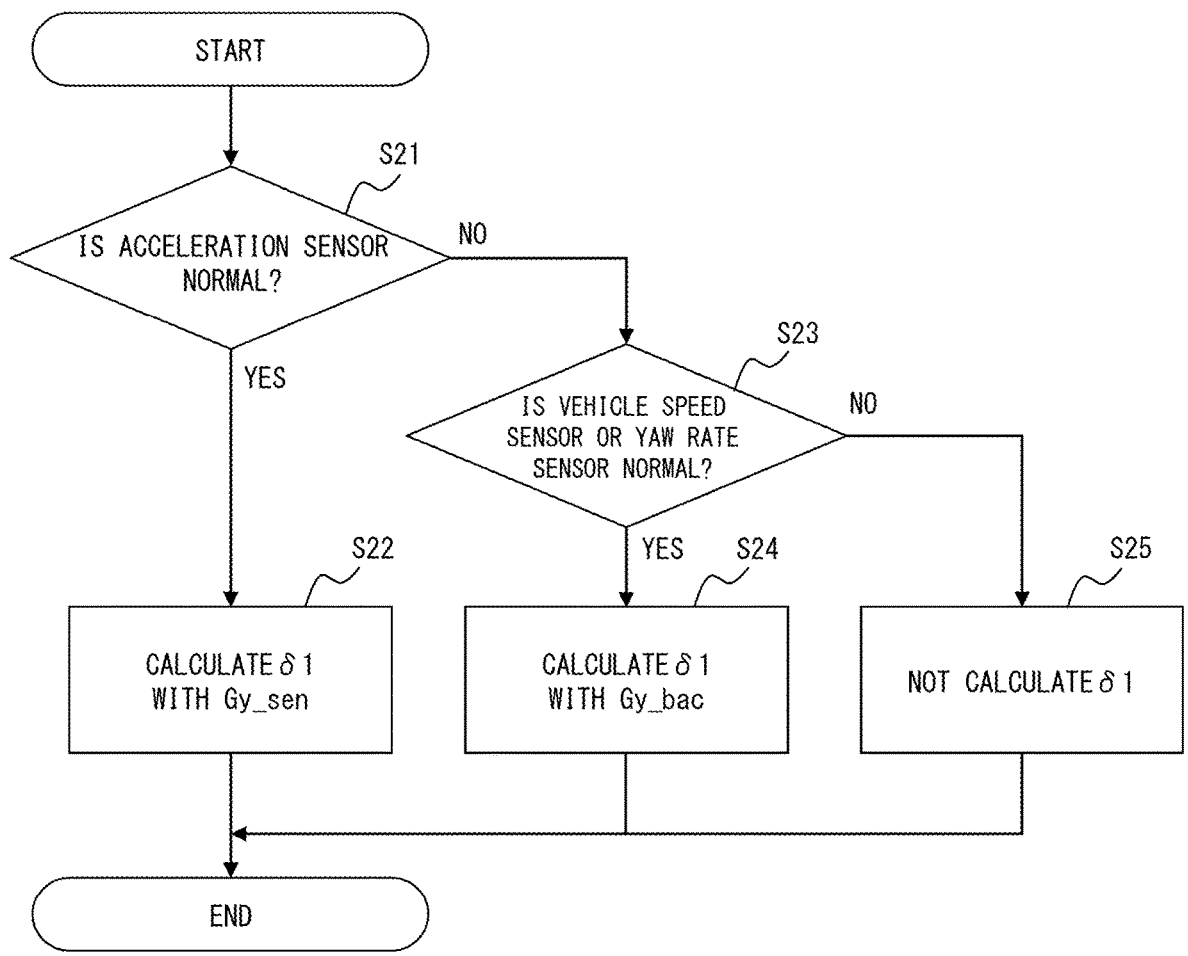
FIG. 7 is a flow chart showing a flow of calculation processing of a target steering angle executed by the controller in the first embodiment.

FIG. 7 is a flow chart showing a flow of calculation processing of the target steering angle θ* executed by the controller 40 (the processor). It should be noted that the lateral acceleration Gy is only used to calculate the slant FF control term δ1 in the series of the calculation processing of the target steering angle θ*. Therefore, in the example shown in FIG. 7, the flow of the processing focusing on the calculation of the slant FF control term δ1 will be described.

The processing routine shown in FIG. 7 is repeatedly executed every predetermined control cycle.

In the routine shown in FIG. 7, first, it is judged whether or not the acceleration sensor 31 is normal (step S21). The content of the processing of the step S21 is the same as that of the step S12 of FIG. 5.

If the judgement result of the step S21 is positive, the slant FF control term δ1 is calculated by using the detected value Gy_sen (step S22). The fact that the judgement result is positive means that the acceleration sensor 31 is judged to be normal. The processing of the step S22 is executed as processing executed by the automatic steering control part 42.

If the judgement result of the step S21 is negative, it is judged whether or not the vehicle speed sensor 32 or the yaw rate sensor 33 is normal (step S23). The judgement of the step S23 is executed based on the error signal inputted from the vehicle speed sensor 32 or the yaw rate sensor 33. When two or more vehicle speed sensors 32 (or yaw rate sensors 33) are mounted on the vehicle 10, the processing of the step S23 may be executed by appropriately utilizing the judgement method of the acceleration sensor 31 described above.

If the judgement result of the step S23 is positive, the slant FF control term δ1 is calculated by using the backup value Gy_bac (step S24). The fact that the judgement result is positive means that vehicle speed sensor 32 and the yaw rate sensor 33 are judged to be normal. Therefore, the reliability of the estimation value Gy_est and the backup value Gy_bac are maintained. The processing of the step S24 is executed as processing executed by the fail-safe control part 43.

If the judgement result of the step S23 is negative, the calculation of the slant FF control term δ1 is stopped (step S25). The fact that the judgement result is negative means that vehicle speed sensor 32 or the yaw rate sensor 33 is judged to be abnormal. Then, it is expected that the reliability of the estimation value Gy_est that was calculated by using the driving speed V and the yaw rate γ is decreased. Therefore, the calculation of the slant FF control term δ1 is stopped in order to suppress an increase in the deviation amount to the target pass line.

If the calculation of the slant FF control term δ1 is stopped, the calculation of the target steering angle θ* is executed while excluding the slant FF control term δ1. That is, the target tire turning angle δ* of the equation (9) is calculated by using only the basic target tire turning angle δ0. In this case, however, since the slant FF control term δ1 is not taken into account in calculating the target steering angle θ*, there is a possibility that the deviation amount to the target pass line increases.

Therefore, in this case, the lateral deviation integral control gain K4 is increased. As mentioned above, the greater the lateral deviation integral control gain K4, the higher the speed at which the lateral deviation Dy is accumulated. Therefore, if such a gain adjustment is executed when the calculation of the slant FF control term δ1 is stopped, it is possible to suppress a decrease in the tracking performance to target pass line due to the exclusion of the slant FF control term δ1. Note that the lateral deviation integral control gain K4 is adjusted by the fail-safe control part 43.

If the reason why the judgement result of the step S23 is negative is due to the occurrence of the anomaly in the vehicle speed sensor 32, the calculation of the FB control term Ay3 is also stopped in the processing of the step S25. This is because the driving speed V is used to calculate the FB control term Ay3 (see the equation (3)). If the calculation of the FB control term Ay3 is stopped, it is possible to suppress the decrease in the tracking performance to the target pass line.

1-4. Effect

According to the first embodiment described above, when the anomaly occurs in the acceleration sensor 31, the use of the detected value Gy_sen is stopped and the backup value Gy_bac is used instead. Therefore, even after the anomaly occurs in the acceleration sensor 31, it is possible to continue to calculate the target steering angle $\theta^*$ and to execute the automatic steering control.

Figure 8:
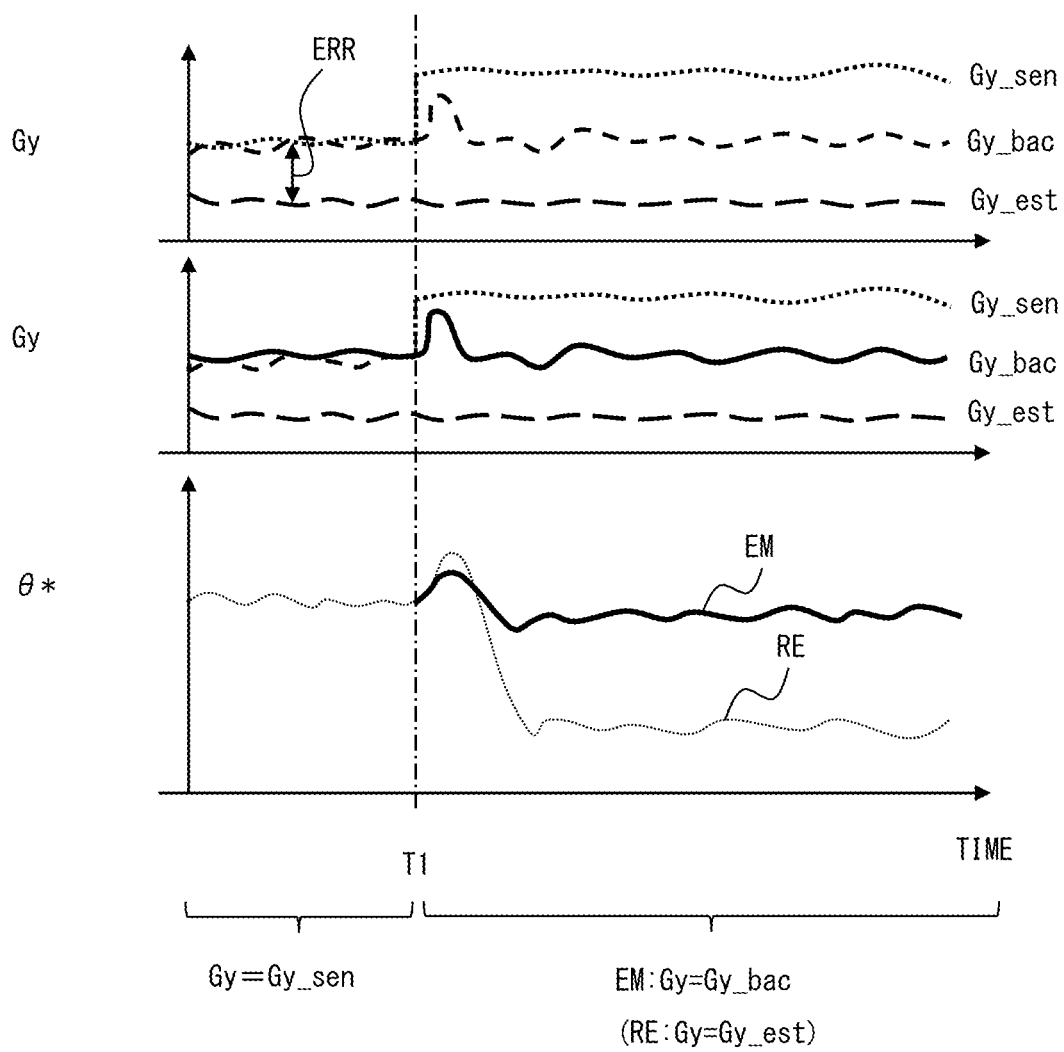
FIG. 8 is a timing chart for explaining an effect by the first embodiment.

In particular, according to the first embodiment, the following effect is expected since the learning value KGy is calculated. FIG. 8 is a timing chart for explaining the effect obtained by calculating the learning value KGy. An upper part of FIG. 8 shows transitions in three types of the lateral acceleration Gy (i.e., the detected value Gy_sen, the estimation value Gy_est, and the backup value Gy_bac). As can be seen from these transitions, the detected value Gy_sen changes significantly at timing T1. The change in this detected value Gy_sen means that the anomaly occurs in the acceleration sensor 31 at the timing T1.

In the middle part of FIG. 8, the lateral acceleration Gy used to calculate the target steering angle $\theta^*$ is shown in a solid line. As can be seen from comparing the solid line in the middle part with the three types of the lateral acceleration Gy in the upper part, the detected value Gy_sen is used to calculate the target steering angle $\theta^*$ before the timing T1. On the other hand, after the timing T1, the backup value Gy_bac is used to calculate target steering angle $\theta^*$. This is because the fail-safe control is executed after the timing T1. Note that the slight change in the backup value Gy_bac in a short period immediately after the timing T1 is due to a fact that the backup value Gy_bac and the target steering angle $\theta^*$ are calculated by using the detected value Gy_sen until the execution of the fail-safe control is started.

In the lower part of FIG. 8, a solid line (EM) shows the transition of the target steering angle $\theta^*$ when the backup value Gy_bac is used after the timing T1. As a comparative example, a broken line (RE) shows the transition of the target steering angle $\theta^*$ when the estimation value Gy_est is used after the timing T1. As can be seen by comparing the solid line (EM) and the broken line (RE), when the backup value Gy_bac is used, a width in the change of the target steering angle $\theta^*$ immediately after the timing T1 is smaller than when the estimation value Gy_est is used. This is because that the former case calculates the learning value KGy during the acceleration sensor 31 is normal and the estimation value Gy_est calculated after the timing T1 continues to be corrected by this learning value KGy (i.e., learning value KGy_p).

As described above, according to the first embodiment, the width in the change of the steering torque caused by the starting of the execution of the fail-safe control can be minimized to suppress the occupant of the vehicle VH from feeling of a strangeness.

In addition, according to the first embodiment, when the abnormality occurs in the acceleration sensor 31, and the abnormality occurs in the vehicle speed sensor 32 or the yaw rate sensor 33, the calculation of target steering angle $\theta^*$ can be continued by excluding the slant FF control term $\delta 1$ from the calculation. Therefore, even in such cases, it is possible to continue to execute the automatic steering control. Further, in this case, since the lateral deviation integral control gain K4 is increased, it is possible to compensate the reduction in the tracking performance to target pass line due to the exclusion of the slant FF control term $\delta 1$.

2. Second Embodiment

Next, an automatic steering system according to a second embodiment of the present disclosure will be explained with reference to FIGS. 9 and 10. Note that descriptions overlapping with those in the first embodiment are omitted as appropriate.

2-1. Outline

In the first embodiment, when the anomaly occurs in the acceleration sensor 31, the lateral acceleration Gy used to calculate the target steering angle $\theta^*$ is changed automatically from the detected value Gy_sen to the backup value Gy_bac as the fail-safe control starts to be executed. However, as described in the lower part of FIG. 8, the backup value Gy_bac and target steering angle $\theta^*$ are calculated by using the detected value Gy_sen in the period (hereinafter, also referred to as a "transition period") PT after the timing T1 and until the execution of the fail-safe control is started. Therefore, it is inevitable that the target steering angle $\theta^*$ is changed in this transition period PT.

However, depending on slant FF control term $\delta 1\_T1$ at or immediately after the timing T1 or, it is also assumed that the change of the target steering angle $\theta^*$ in the transition period PT is permissive. In the second embodiment, therefore, the transition period PT is extended in accordance with an absolute value $|\delta 1\_T1|$ of the slant FF control term $\delta 1\_T1$. FIG. 9 is a diagram illustrating an extension example of the transition period PT. FIG. 9 shows the lateral acceleration Gy used for the calculation of the target steering angle $\theta^*$ (i.e., the calculation of slant FF control term $\delta 1$). The combination of the detected value Gy_sen and the backup value Gy_bac_em1 shown in this FIG. 9 correspond to the lateral acceleration Gy shown by the solid line in the middle part of FIG. 8.

Figure 9:
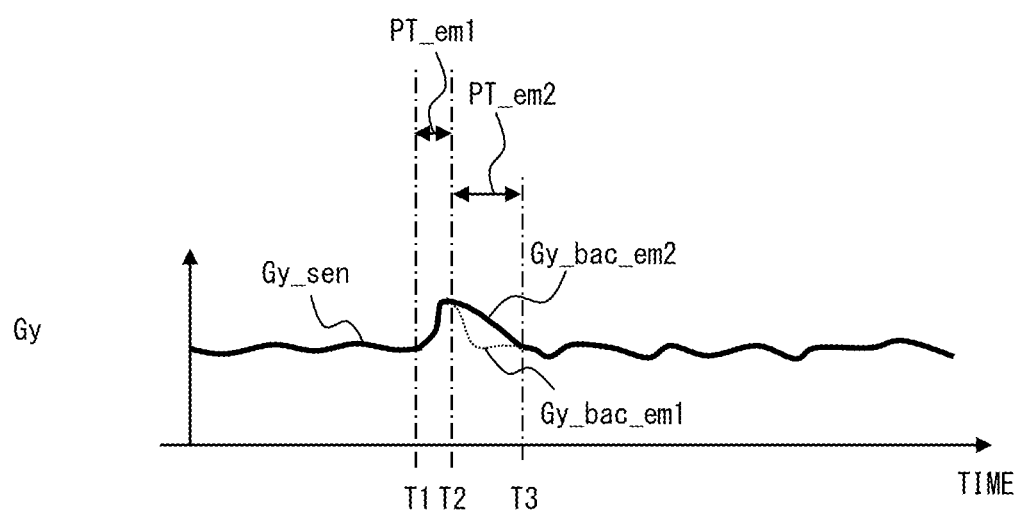
FIG. 9 is a timing chart explaining an outline of a second embodiment.

The transition period PT_em1 from the timing T1 to the timing T2 shown in FIG. 9 corresponds to transition period PT of first embodiment. In the second embodiment, the transition period PT_em2 from timing T2 to T3 is set in accordance with the absolute value $|\delta 1\_T1|$. Where a larger value of the absolute value $|\delta 1\_T1|$ means that the position of the vehicle VH is easily shifted in the inclination direction of the road surface. Therefore, the transition period PT_em2 is set to a longer period as the absolute value $|\delta 1\_T1|$ decreases.

In the transition period PT_em2, the target steering angle $\theta^*$ is calculated by using the lateral acceleration Gy intermediate value Dy_mid. The intermediate value Dy_mid is a value between the detected value Dy_sen and the backup value Dy_bac. The intermediate value Dy_mid is set to be equal to the detected value Dy_sen at the timing T2. The intermediate value Dy_mid is set so as to approach the backup value Dy_bac from the timing T2 toward T3. By setting such the transition period PT_em2, change rate of the target steering angle $\theta^*$ in the intermediate value Dy_mid slows down.

Note that setting processing of the transition period PT_em2 is realized by one function of the fail-safe control part 43 shown in FIG. 2. Setting processing of the intermediate value Dy_mid is realized by one function of the backup value calculation part 44 shown in FIG. 2.

2-2. Target Steering Angle Calculation Processing

Figure 10:
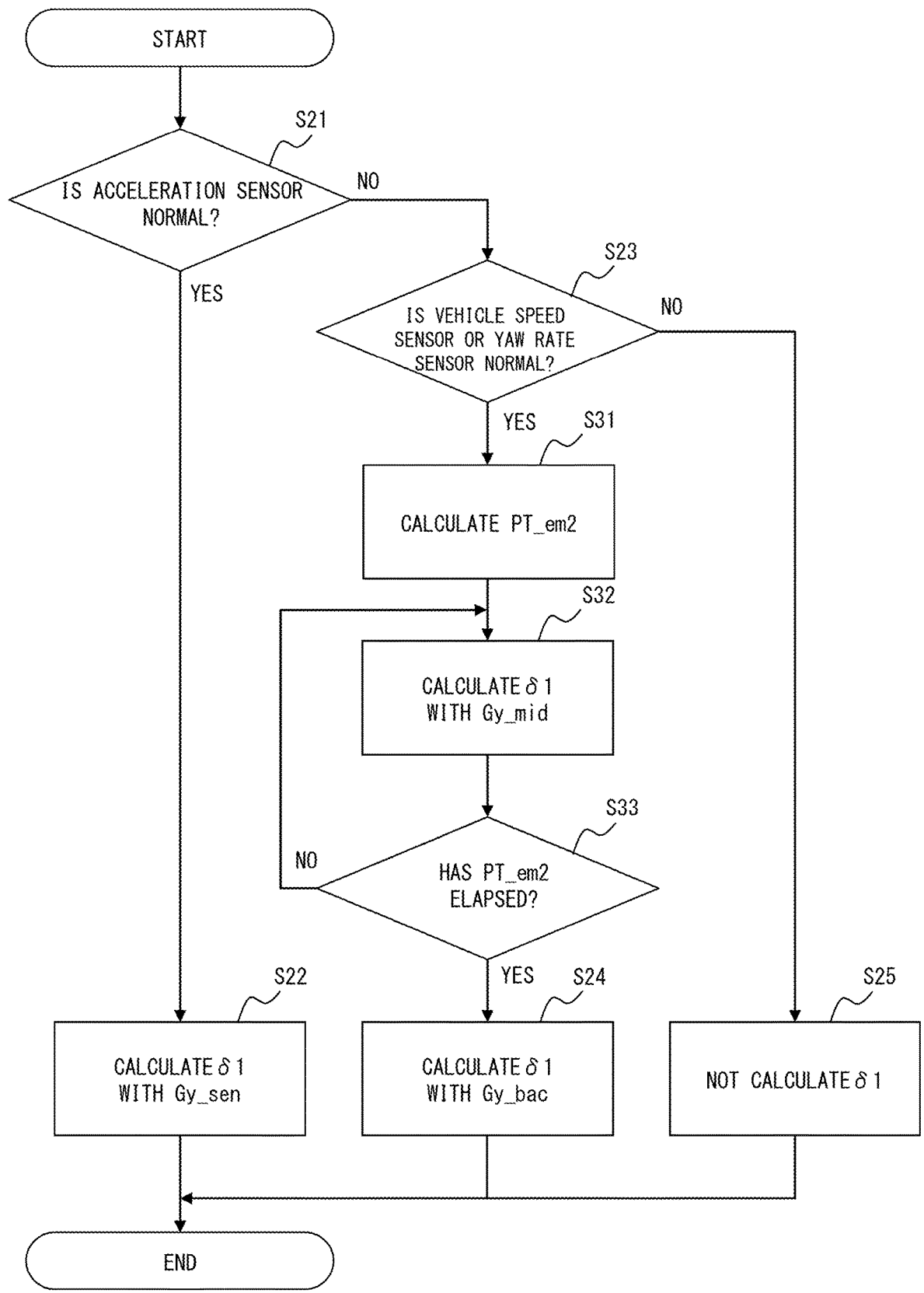
FIG. 10 is a flow chart showing a flow of calculation processing of the target steering angle executed by the controller in the second embodiment.

FIG. 10 is a flow chart showing the flow of the calculation processing of the target steering angle $\theta^*$ executed by the controller 40. For the same reason as described in the explanation of FIG. 7, the flow of the processing focusing on the calculation of the slant FF control term $\delta 1$ will be explained in the example shown in FIG. 10. The processing routine shown in FIG. 10 is repeatedly executed every predetermined control cycle.

In the routine shown in FIG. 10, if the judgement result of step S23 is positive, the processing of steps S31 to S33 is executed. The rest of the processing is the same as the processing described in FIG. 8. The processing of steps S31 to S33 will be described below.

In the step S31, the transition period PT_em2 is calculated. The transition period PT_em2 is calculated based on the absolute value of the slant FF control term δ1 (i.e., the absolute value |δ1_T1|) calculated at or immediately before an execution timing of the processing of the step S21. Specifically, the transition period PT_em2 is set to a longer period as the absolute value |δ1_T1| decreases.

In the step S32, the slant FF control term δ1 is calculated by using the intermediate value Gy_mid. The intermediate value Gy_mid is calculated by using, for example, the following equation (13).

$$Gy\_mid = Gy\_sen\_T1 \times Gy\_bac(t) \times C(t) \quad (13)$$

In the equation 13, Gy_sen_T1 is the detected value Gy_sen at or immediately before the processing timing of step S21. Gy_bac(t) is the backup value Gy_bac calculated from time to time in the transition period PT_em2. C(t) is a coefficient that decreases with an elapsed time t.

In the step S33, it is judged whether or not the transition period PT_em2 has elapsed. If the judgement result of the step S33 is negative, the processing of the step S32 is executed again. That is, the processing of the steps S32 and S33 is repeatedly executed until a positive judgement result is obtained in the step S33. When the positive judgement result is obtained, the processing of the step S24 is executed.

2-3. Effect

According to the second embodiment described above, the transition period PT_em2 is set appropriately in accordance with the absolute value |δ1_T1|. The transition period PT_em2 is set to the longer period as the absolute value |δ1_T1| decreases. Further, in the transition period PT_em2, the target steering angle θ* is calculated by using the intermediate value Dy_mid. Therefore, it is possible to reduce change rate of the target steering angle θ* in the transition period PT_em2. When the change rate is reduced, it is possible to suppress the occupant of the vehicle VH from feeling of the strangeness in the transition period PT_em2.

What is claimed is:

1. An automatic steering system for executing automatic steering control of a vehicle, comprising:
    a detection device which is configured to detect driving environment information of the vehicle; and
    a controller which is configured to execute target steering angle calculation processing to calculate a target steering angle in the automatic steering control based on the driving environment information,
    wherein:
    the detection device includes:
    an acceleration sensor which is configured to detect lateral acceleration of the vehicle;
    a vehicle speed sensor which is configured to detect driving speed of the vehicle; and
    a yaw rate sensor is configured to detect yaw rate of the vehicle,
    the controller is further configured to calculate a learning value of the lateral acceleration,
    the learning value is calculated based on an error of a detected value of the lateral acceleration and an estimation value of the lateral acceleration calculated by using the driving speed and the yaw rate,
    in the target steering angle calculation processing, the controller is configured to:
    judge whether or not the acceleration sensor is normal;
        if it is judged that the acceleration sensor is normal, calculate the target steering angle by using the detected value; and
        if it is judged that the acceleration sensor is abnormal, switch the lateral acceleration used to calculate the target steering angle from the detected value to a backup value of the lateral acceleration,
    the backup value is calculated by using the estimation value and the learning value that is calculated before a timing at which the acceleration sensor is judged to abnormal;
    in the target steering angle calculation processing, the controller is configured to calculate the target steering angle by using a slant angle feedforward control term that is set in accordance with a slant angle of a road,
    if it is judged that the acceleration sensor is normal, the slant angle feedforward control term is calculated by using the detected value; and
    if it is judged that the acceleration sensor is abnormal, the slant angle feedforward control term is calculated by using the backup value after a predetermined transition period that is reckoning from the timing,
    during the transition period, the slant angle feedforward control term is calculated by using an intermediate value that gradually approaches the backup value from the detected value, and
    the transition period is set to a longer period as an absolute value of the slant angle feedforward control term calculated by using the detected value immediately before the timing decreases.

2. An automatic steering system for executing automatic steering control of a vehicle, comprising
    a detection device which is configured to detect driving environment information of the vehicle; and
    a controller which is configured to execute target steering angle calculation processing to calculate a target steering angle in the automatic steering control based on the driving environment information,
    wherein:
    the detection device includes:
    an acceleration sensor which is configured to detect lateral acceleration of the vehicle;
    a vehicle speed sensor which is configured to detect driving speed of the vehicle; and
    a yaw rate sensor is configured to detect yaw rate of the vehicle,
    the controller is further configured to calculate a learning value of the lateral acceleration,
    the learning value is calculated based on an error of a detected value of the lateral acceleration and an estimation value of the lateral acceleration calculated by using the driving speed and the yaw rate,
    in the target steering angle calculation processing, the controller is configured to:
    judge whether or not the acceleration sensor is normal, wherein:
    if it is judged that the acceleration sensor is normal, calculate the target steering angle by using the detected value; and
    if it is judged that the acceleration sensor is abnormal, switch the lateral acceleration used to calculate the target steering angle from the detected value to a backup value of the lateral acceleration, the backup value is calculated by using the estimation value and the learning value that is calculated before a timing at which the acceleration sensor is judged to abnormal;

further in the target steering angle calculation processing, the controller is configured to calculate the target steering angle by using a slant angle feedforward control term that is set in accordance with a slant angle of a road, wherein:

if it is judged that the acceleration sensor is normal, the slant angle feedforward control term is calculated by using the detected value; and if it is judged that the acceleration sensor is abnormal, the slant angle feedforward control term is calculated by using the backup value after a predetermined transition period that is reckoning from the timing, during the transition period, the slant angle feedforward control term is calculated by using an intermediate value that gradually approaches the backup value from the detected value, the transition period is set to a longer period as an absolute value of the slant angle feedforward control term calculated by using the detected value immediately before the timing decreases;

in the target steering angle calculation processing, the controller is configured to:

calculate the slant angle feedforward control term that is set in accordance with the slant angle of the road;

calculate, based on the driving environment information, a line following control term indicating a control term for reducing deviation amount of the vehicle to target pass line, the line following control term including a time-integrated integral control term obtained by integrating the deviation amount over time;

if it is judged that the acceleration sensor is abnormal, judge whether or not the vehicle speed sensor and the yaw rate sensor are normal;

if it is judged that the vehicle speed sensor and the yaw rate sensor are normal, calculate the target steering angle by using the line following control term and the slant angle feedforward control term; and if it is judged that the vehicle speed sensor or the yaw rate sensor is abnormal, calculate the target steering angle by using the time-integrated integral control term instead of the slant angle feedforward control term, and when the slant angle feedforward control term is not used, a control gain of the time-integrated integral control term is increased as compared with a case where the slant angle feedforward control term is used.

3. An automatic steering method to execute automatic steering control of a vehicle by a controller, wherein:

the vehicle comprises a detection device which is configured to detect driving environment information of the vehicle, the detection device includes:

an acceleration sensor which is configured to detect lateral acceleration of the vehicle;

a vehicle speed sensor which is configured to detect driving speed of the vehicle; and a yaw rate sensor is configured to detect yaw rate of the vehicle, the method comprising the steps of:

executing target steering angle calculation processing to calculate a target steering angle in the automatic steering control based on the driving environment information; and calculating a learning value of the lateral acceleration, wherein the learning value is calculated based on an error of a detected value of the lateral acceleration and an estimation value of the lateral acceleration calculated by using the driving speed and the yaw rate, the step of executing the target steering angle calculation processing includes the steps of:

judging whether or not the acceleration sensor is normal;

if it is judged that the acceleration sensor is normal, calculating the target steering angle by using the detected value; and if it is judged that the acceleration sensor is abnormal, switching the lateral acceleration used to calculate the target steering angle from the detected value to a backup value of the lateral acceleration, the backup value is calculated by using the estimation value and the learning value that is calculated before a timing at which the acceleration sensor is judged to abnormal;

the step of executing the target steering angle calculation processing further includes the step of calculating the target steering angle by using a slant angle feedforward control term that is set in accordance with a slant angle of a road, wherein:

if it is judged that the acceleration sensor is normal, the slant angle feedforward control term is calculated by using the detected value; and if it is judged that the acceleration sensor is abnormal, the slant angle feedforward control term is calculated by using the backup value after a predetermined transition period that is reckoning from the timing, during the transition period, the slant angle feedforward control term is calculated by using an intermediate value that gradually approaches the backup value from the detected value, and the transition period is set to a longer period as an absolute value of the slant angle feedforward control term calculated by using the detected value immediately before the timing decreases.

4. The automatic steering method according to claim 3, wherein:

the step of executing the target steering angle calculation processing includes the steps of:

calculating the slant angle feedforward control term that is set in accordance with the slant angle of a road;

calculating, based on the driving environment information, a line following control term indicating a control term for reducing deviation amount of the vehicle to target pass line is calculated, wherein the line following control term includes a time-integrated integral control term obtained by integrating the deviation amount over time;

if it is judged that the acceleration sensor is abnormal, judging whether or not the vehicle speed sensor and the yaw rate sensor are normal;

if it is judged that the vehicle speed sensor and the yaw rate sensor are normal, calculating the target steering angle by using the line following control term and the slant angle feedforward control term; and if it is judged that the vehicle speed sensor or the yaw rate sensor is abnormal, calculating the target steering angle by using the time-integrated integral control term instead of the slant angle feedforward control term, and when the slant angle feedforward control term is not used, a control gain of the time-integrated integral control term is increased as compared with a case where the slant angle feedforward control term is used.

\* \* \* \* \*